June 30, 1942.  S. B. GRISCOM  2,287,991
ALTERNATING-CURRENT ELECTRIC POWER SYSTEM
Filed July 12, 1941
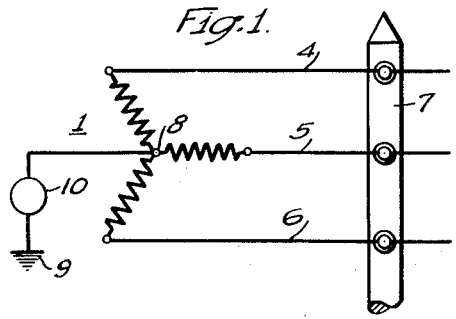
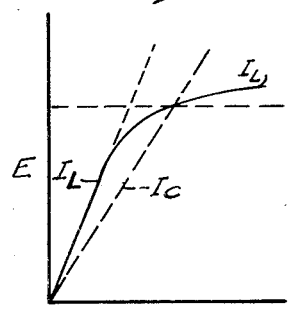
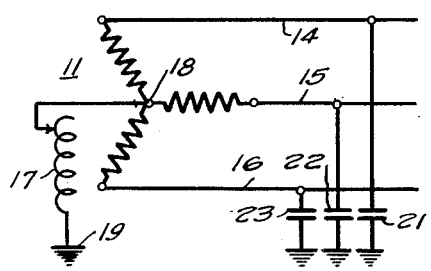
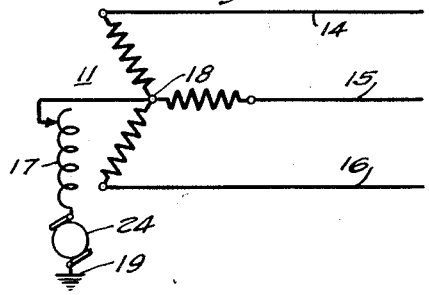
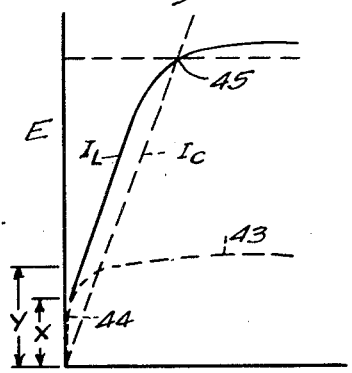
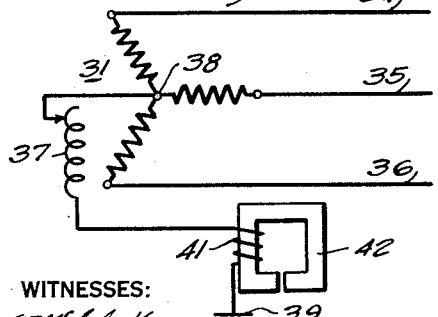
WITNESSES:
INVENTOR
Samuel B. Griscom.
BY
Franklin E. Hardy
ATTORNEY Patented June 30, 1942

2,287,991

UNITED STATES PATENT OFFICE 2,287,991

ALTERNATING-CURRENT ELECTRIC POWER SYSTEM

Samuel B. Griscom, Wilkinsburg, Pa., assignor to Westinghouse Electric & Manufacturing Company, East Pittsburgh, Pa., a corporation of Pennsylvania Application July 12, 1941, Serial No. 402,176

4 Claims. (Cl. 171—97)

My invention relates to improvements in the protection of alternating-current electric power systems, and particularly to transmission systems employing ground fault neutralizers, such as those tuned to the capacitance to ground of the ungrounded parts of an alternating-current circuit, commonly called Petersen coils. In such systems, a grounding reactor is provided that is connected between a neutral point of the system and ground, and is so dimensioned electrically that upon the grounding of one phase conductor of the system a current flows through the grounding reactor which substantially neutralizes the resultant capacity current flowing to ground over the ungrounded phase conductors of the system, thus extinguishing the ground fault current.

This effect is brought about because the ground fault current flowing through the grounding reactor forms a parallel resonant circuit with the effective capacitance to ground of the several ungrounded phase conductors of the system. The electrical connections are such that this desired parallel resonant circuit is inherently a series resonant circuit with respect to certain fundamental frequency residual voltages which may be present in commercial electrical power systems. This situation, while undesirable, is usually accepted as inevitable, and part of its undesirable effect is overcome by the practice of designing the ground fault neutralizer reactance coil to permit carrying a certain proportion—say, 30%—of its rated short time capacity current continuously. Although this design of the coil permits it to carry the necessary current so that it is not injured thermally thereby should it be operated under circumstances where it carries 30% of its rated short time capacity current continuously, the flow of this current causes the neutral point of the system to operate at a voltage that is displaced from ground, that is, differs from ground potential by 30% of the rated phase to neutral voltage of the system. This elevation of the voltage of the neutral point of the system with respect to ground introduces stresses on the insulation of the system, necessitating higher insulation to ground of the system, and also causing greater voltages in neighboring communication circuits that are subject to electrostatic induction from the system conductors.

It is an object of the invention to provide means whereby, for small amounts of residual voltage, the series resonant circuit is eliminated without in any way interfering with the normal functioning of the ground fault neutralizing reactor for extinguishing a ground fault arc on the system.

It is a more specific object of the invention to provide a series resonance current eliminating device in series circuit with the fault grounding reactor coil between the neutral point of the system and ground, the resonance eliminating device being so designed that it offers high reactance to low values of current therethrough, and presents a progressively decreasing reactance to the flow of greater values of current therethrough, with increasing values of current less than that required to neutralize a ground fault.

Other objects and advantages of the invention will be apparent from the following description of a preferred embodiment of the invention, reference being had to the accompanying drawing, in which:

Figure 1 is a diagrammatic view illustrating a circuit in which a residual voltage at fundamental frequency is created;

Fig. 2 is a view representing a simplified diagram of a ground fault neutralizer tuned to the capacity current of the system;

Fig. 3 is a similar diagrammatic view illustrating the effect of a residual voltage;

Fig. 4 is a diagrammatic illustration of a circuit arrangement in which the effect of the residual voltage is overcome; and Figs. 5 and 6 are curves illustrating the operation of the circuit arrangements shown in certain of the other figures of the drawing.

Referring to Fig. 1, a three-phase generator 1 is illustrated for impressing a balanced three-phase voltage on circuit conductorst 4, 5, and 6 of an ungrounded neutral system. If the conductors are mounted in a vertical or horizontal configuration on the poles 7 of the transmission line and are not transposed, the capacitances of the individual conductors to ground will be different. If positioned vertically, as shown, the capacitance of conductor 6, which is nearest to ground, is greater than that of conductors 4 and 5. Since the vector sum of the charging currents to ground flowing from conductors 4, 5, and 6 cannot be other than zero, the voltages from each conductor to ground cannot be equal to each other because the capacitances to ground are unequal. As a result of this situation, a residual fundamental frequency voltage between the neutral point 8 of the system and ground at 9 would exist, and, if a voltmeter 10 is connected between these two points, this voltage will be indicated on the voltmeter. This residual fundamental frequency voltage may be as high as 7% of the normal phase to neutral voltage; that is, of the voltage between a phase conductor 4, 5, or 6 and the neutral point 8, but is likely to be a lesser value, such as 1% or 1½%, and rarely more than 3%.

Fig. 2 is a simplified diagram of a power system in which the neutral point of the system is connected to ground through a ground fault neutralizer of the Petersen coil type. The generator 11 is connected to circuit conductors 14, 15, and 16, and the grounding reactor or Petersen coil 17 is connected between the neutral point 18 of the system and ground at 19. The capacitance to ground of the three conductors 14, 15, and 16 is indicated at 21, 22, and 23, respectively.

Fig. 3 is a view similar to Fig. 2, but includes a generator 24 for simulating a source of residual voltage mentioned with respect to Fig. 1 which may become effective in the series resonant circuit. The residual voltage simulated by the equivalent generator 24 may be amplified by series resonance so as to produce much higher voltages across the reactance coil 17 and between the conductors 14, 15, and 16 and ground. It is not uncommon that this series resonant circuit may magnify the residual voltage twenty times, so that with a 2% residual voltage created by line unbalance, a 40% displacement of the neutral point of the system with respect to ground may occur.

It is the usual practice to provide for meeting this situation by designing the reactance coil 17 so that it will have a steeper voltage-current characteristic slope over the lower voltage values, as shown by the curve $I_L$ in Fig. 5, than the capacitor volt-ampere characteristic of the current to ground to be neutralized, shown by the curve $I_C$, and to provide the coil with an iron magnetic circuit that will saturate at a voltage value below the normal phase to neutral voltage, as shown by the knee of the curve $I_L$, so that the two curves $I_L$ and $I_C$ intersect at the rated voltage. This arrangement is only partially effective, since, as taps are changed on the reactance coil 17 to give varying adjustment of the desired reactance, the point of intersection of the two curves in Fig. 5 also changes, so that for the lower current taps of the reactance coil 17 the saturation point of the reactor is not reached at normal voltage.

Fig. 4 shows a circuit arrangement for overcoming the above pointed-out difficulties. A three-phase generator 31 supplies current to the three circuit conductors 34, 35, and 36, and the neutral point 38 is connected to ground 39 through a grounding reactor 37 that is similar to the reactor 17 and the winding 41 of a resonant current eliminator having a core 42. The core 42 is a substantially closed iron core circuit, and is so proportioned that it has a very high reactance to low values of current through it, but beyond a certain current value its impedance becomes progressively lower due to saturation of the iron core. The volt-ampere characteristic of the winding 41 is shown by the curve 43 in Fig. 6. It will be noted that the lower portion 44 of this curve has a very steep slope as compared to the volt-ampere characteristic curve $I_C$ of the capacitance to be neutralized. It will also be noted that at a relatively low value of normal line to neutral voltage "X", the core 42 starts to saturate, as shown by the knee of the curve 43, and is substantially saturated at a slightly higher value "Y", as shown in Fig. 6.

For the purpose of more clearly distinguishing the characteristic curves $I_L$, $I_C$ and 43 from each other, the curve 43 is not drawn to the same voltage scale as are the other two curves, the voltages "X" and "Y" representing the values of perhaps 4% and 5%, respectively, of the normal rated line to neutral voltage of the circuit. The curve $I_L$ in Fig. 6 represents the volt-ampere curve of the two reactor windings 37 and 41 in series. It will be noted that the slope of the curve $I_L$ above the knee of the curve 43 is substantially that of the curve $I_C$. The knee of the curve $I_L$ and the point of intersection 45 of this curve with the curve $I_C$ are determined to a large extent by the curve 43, so that the range and rate of saturation of the Petersen coil 17 or 37 is not so critical when the resonant current eliminator is employed in series therewith. It will be appreciated that for residual voltages of magnitudes less than, say, 4%, of normal line to neutral voltage, as represented by "X" in Fig. 6, the two curves 43 and $I_C$ have greatly different slopes, thus effectively destroying the series resonance effect, while the two curves $I_L$ and $I_C$ are fairly close together throughout voltage values up to the rated voltage of the circuit, thus maintaining a high efficiency of the normal functioning of the ground fault neutralizing reactor 37.

Since modifications in the circuits and arrangement of parts from the specific embodiment disclosed may be made within the spirit of my invention, I do not wish to be limited otherwise than by the scope of the appended claims.

I claim as my invention:

1. In combination, an alternating-current electrical transmission system having a ground fault neutralizer comprising a grounding reactor connected between a neutral point of the system and ground and so dimensioned electrically as upon the grounding of one phase conductor of the system to substantially neutralize the capacity current to ground of the ungrounded part of the system, and a resonance current eliminating device connected in series with said grounding reactor comprising a winding inductively related to a core and so dimensioned electrically as to saturate at a voltage applied across the winding corresponding substantially to 5% of normal line to neutral voltage.

2. In combination, an alternating-current electrical transmission system having a ground fault neutralizer comprising a grounding reactor connected between a neutral point of the system and ground and so dimensioned electrically as upon the grounding of one phase conductor of the system to substantially neutralize the capacity current to ground of the ungrounded part of the system, and a resonance current eliminating device connected in series with said grounding reactor comprising a winding inductively related to a core and so dimensioned electrically as to present a very high reactance to low values of current through it and to present a progressively lower reactance to the flow of current through it above about 4% of normal line to neutral voltage.

3. In combination, an alternating-current electrical transmission system having a ground fault neutralizer comprising a grounding reactor connected between a neutral point of the system and ground and so dimensioned electrically as, upon the grounding of one phase conductor of the system, to substantially neutralize the capacity current to ground of the ungrounded part of the system, and a resonance current eliminating device connected in series with said grounding reactor comprising a second reactance device so dimensioned electrically as to present a much higher reactance to the flow of low values of current through it than does the grounding reactor and to present a progressively lower reactance to the flow of current through it to a value less than the reactance of the grounding reactance upon the application of a small fraction of the normal line to neutral voltage across the second reactance device.

4. In combination, an alternating-current electrical transmission system having a ground fault neutralizer comprising a grounding reactor connected between a neutral point of the system and ground and so dimensioned electrically as to take upon the grounding of one phase conductor of the system a current which substantially neutralizes the resultant capacity current flowing to ground over the ungrounded phase conductors of the system, and a resonance current eliminating device connected in series with said grounding reactor between said neutral point of the system and ground and so dimensioned electrically as to present a much higher reactance to the flow of low values of current through it than does the grounding reactor and to present a progressively lower reactance to the flow of current through it at current values below that which flowing in the grounding reactor neutralizes the capacity current above-named.

SAMUEL B. GRISCOM.